(12) United States Patent
Teslak et al.

(10) Patent No.: US 7,147,239 B2
(45) Date of Patent: Dec. 12, 2006

(54) WHEEL CREEP CONTROL OF HYDRAULIC HYBRID VEHICLE USING REGENERATIVE BRAKING

(75) Inventors: Chris Teslak, Plymouth, MI (US); Cliff Carlson, Fenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 349 days.

(21) Appl. No.: 10/883,292

(22) Filed: Jul. 1, 2004

(65) Prior Publication Data
US 2006/0000659 A1 Jan. 5, 2006

(51) Int. Cl.
*B60K 6/12* (2006.01)
(52) U.S. Cl. .................. 280/306; 180/165; 180/307; 60/414
(58) Field of Classification Search .............. 180/165, 180/307, 305, 306, 65.2, 65.3; 60/414, 416
See application file for complete search history.

(56) References Cited

U.S. PATENT DOCUMENTS

| | | | |
|---|---|---|---|
| 2,557,658 A | | 6/1951 | Hoffmann |
| 3,700,060 A | * | 10/1972 | Keene et al. ............... 180/165 |
| 4,098,083 A | * | 7/1978 | Carman .......................... 60/414 |
| 4,993,780 A | * | 2/1991 | Tanaka et al. ................. 303/3 |
| 5,326,158 A | * | 7/1994 | Ohori et al. ................... 303/3 |
| 5,495,912 A | * | 3/1996 | Gray et al. .................. 180/165 |
| 5,505,527 A | * | 4/1996 | Gray et al. .................... 303/3 |
| 5,839,533 A | * | 11/1998 | Mikami et al. ............. 180/165 |
| 6,099,089 A | * | 8/2000 | Schneider .................... 303/152 |
| 6,113,197 A | * | 9/2000 | Kuroki et al. ................ 303/11 |
| 6,119,802 A | * | 9/2000 | Puett, Jr. ..................... 180/242 |
| 6,325,470 B1 | * | 12/2001 | Schneider .................... 303/152 |
| 6,719,080 B1 | * | 4/2004 | Gray, Jr. ....................... 180/165 |
| 6,834,737 B1 | * | 12/2004 | Bloxham .................... 180/165 |
| 7,082,757 B1 | * | 8/2006 | Teslak et al. ................. 60/414 |

FOREIGN PATENT DOCUMENTS

| | | |
|---|---|---|
| DE | 68912875 | 5/1994 |
| GB | 1053295 | 8/1962 |

OTHER PUBLICATIONS

SAE Technical Paper Series 2002-01-3128, R.P. Kepner, Ford Motor Company, Hydraulic Power Assist—A Demonstration of Hydraulic Hybrid Vehicle Regenerative Braking in a Road Vehicle Application, Nov. 18-20, 2002, pp. 1-8.

* cited by examiner

*Primary Examiner*—J. Allen Shriver
(74) *Attorney, Agent, or Firm*—David B. Kelley; MacMillan, Sobanski & Todd

(57) ABSTRACT

A system according to this invention opposes creep in a hydraulic hybrid motor vehicle. An accumulator contains fluid at high pressure, and a reservoir contains fluid at lower pressure. An engine produces positive torque at the wheels during an engine idle condition, and a pump/motor, driveably connected to the wheels and the engine, has a variable volumetric displacement pumps fluid to the accumulator from the reservoir. A control system determines a magnitude of negative torque transmitted from the wheels to the pump/motor that would exceed the magnitude of positive torque, determines the volumetric displacement of the pump/motor corresponding to the magnitude of negative torque, changes the displacement of the pump/motor to the required displacement, and operates the pump/motor as a pump driven by negative torque from the wheels to pump fluid from the reservoir to the accumulator.

10 Claims, 3 Drawing Sheets

US 7,147,239 B2

WHEEL CREEP CONTROL OF HYDRAULIC HYBRID VEHICLE USING REGENERATIVE BRAKING

BACKGROUND OF THE INVENTION

The invention relates to a hybrid vehicle drive system having a primary power source, such as a conventional internal combustion engine, and another power source, such as an accumulator containing high pressure fluid. More particularly, the invention pertains to vehicle hill holding using a hydraulic drive system.

Hydraulic Power Assist (HPA) is a type of hydraulic hybrid vehicle, in which energy from regenerative braking or from an engine is stored in a hydro-pneumatic accumulator, and the conversion between mechanical power and hydraulic power is achieved through high pressure pump/motor having a variable volumetric displacement. In an HPA system, using stored energy from regenerative braking to help accelerate the vehicle reduces the burden on the engine and reduces fuel use.

Because of the high power density available with such hydraulic systems, it is possible to recover efficiently a significant portion of braking energy with an HPA system comprised of a single pump/motor and storage accumulators. With a 7000 lb. vehicle and a pump/motor whose maximum displacement is 150 cc., an HPA system can recover 72 percent of the available braking energy in the Environmental Protection Agency (EPA) city cycle. The pump/motor operates for long periods at higher displacements and with a relatively high cycle average efficiency of 88 percent. With a return of 56 percent of the braking energy to the drive wheels (72 percent recovered in braking, and 88 percent transfer efficiency in both pumping and motoring), it is possible to recover 56 percent of the vehicle kinetic energy (or 75 percent of the velocity) while accelerating, neglecting road load friction. In the EPA city cycle it was possible to fill the hydraulic system when braking from 30 mph and then moderately accelerate again to about 22 mph using only stored energy from the HPA system.

U.S. Pat. No. 5,505,527 describes a vehicle powertrain having regenerative braking that includes wheels and a brake pedal which, upon engagement, is activated first into a first zone of operation and then into a second zone of operation. A braking detector detects either a released state or an engaged state for the brake pedal and, if in the engaged state, detects if the pedal is in the first or the second zone of operation. Friction brakes brake a pair of the wheels, responsive to detection of the brake pedal within the second zone of operation. The hydraulic portion of the drivetrain includes an accumulator for storing hydraulic fluid under pressure, and a reservoir for storing the hydraulic fluid at a lower pressure. A pump/motor, located in the high pressure line, operates as a motor to drive the drive wheels in a drive mode and as a pump driven by the drive wheels in a braking mode. A prime mover, having its inlet connected to the reservoir through a low pressure line and its outlet connected to the accumulator through a high pressure line, hydraulically drives the pump/motor in its motor mode. A controller switches the pump/motor into the braking mode in responsive to detection of an engaged state for the brake pedal and into the drive mode in responsive to detection of the released state of the brake pedal. A switch valve connects the high pressure line to the accumulator in the braking mode and to the reservoir in the drive mode.

In a hybrid hydraulic vehicle, vehicle braking may be accomplished by a combination of regenerative braking of the driven wheels and friction braking of all the wheels. Regenerative braking occurs when the vehicle is slowed or braked by wheels that drive a variable displacement pump/motor, which pumps hydraulic fluid into an accumulator. When the vehicle speed is too slow for regenerative braking to be effective, the friction brakes may have insufficient braking capacity at the expected brake pedal position. Then the driver may have to exert an uncomfortable level of force on the brake pedal to produce the level of friction braking desired. This condition is most evident when the vehicle is stopped and an automatic transmission in a forward drive or reverse drive range. In this case, displacement of the hydraulic pump/motor is increased to produce slightly more torque at the wheels than the torque transmitted there by an idling engine driving a torque converter, the automatic transmission, driveshaft and axle shafts. In this way, with minimal brake pedal effort, the vehicle is prevented from creeping or rolling inadvertently on the road surface. If, however, the vehicle is on a hill or for some other reason begins to roll despite the pump/motor operating at maximum displacement, the pump/motor displacement is returned to zero, and the driver must depress the brake pedal further to more fully apply the friction brakes and reduce regenerative braking. If the pressure in the high pressure accumulator, which stores energy recovered from vehicle kinetic energy while braking, is low, then a small amount of pumping under these conditions may be allowed.

SUMMARY OF THE INVENTION

To overcome this difficulty, the displacement of the hydraulic pump/motor is increased to require slightly more torque than the torque produced by an idling engine driving a torque converter of an automatic transmission. This will prevent vehicle creep, the slow acceleration of the vehicle due to torque transmitted from the engine through the torque converter and automatic transmission, on a flat surface with minimal brake pedal effort. If the vehicle is on a hill or for some other reason begins to roll despite the pump/motor operating a maximum displacement, the volumetric displacement of the pump/motor is returned to zero, and the driver must resort to pressing harder on the brake pedal to prevent undesired pumping. If pressure in the high pressure accumulator is low, then a small amount of pumping under these conditions may be allowed.

Using regenerative braking energy for vehicle acceleration can provide a significant fuel economy benefit without the complications of repetitive engine starting and stopping or cruise load leveling. Since HPA can provide this fuel economy benefit without significant changes to the conventional powertrain, it is possible to achieve the fuel economy benefit without adversely affecting vehicle performance.

A method according to this invention opposes creep in a vehicle that includes wheels driveably connected to a pump/motor having a variable volumetric displacement for pumping fluid to a high pressure accumulator from a low pressure reservoir, and an engine driveably connected to the wheels and to the pump/motor. The method includes the steps of determining a magnitude of positive torque at the wheels that is transmitted from the engine during an engine idle condition; determining a magnitude of negative torque transmitted from the wheels to the pump/motor that would exceed said magnitude of positive torque and hold the wheels against creeping; determining the volumetric displacement of the pump/motor corresponding to said magnitude of negative torque; changing the displacement of the pump/motor to said volumetric displacement; and operating the pump/motor as a pump driven by negative torque from the wheels to pump fluid from the reservoir to the accumulator.

A system according to this invention opposes creep in a hydraulic hybrid motor vehicle. An accumulator contains fluid at high pressure, and a reservoir contains fluid at lower pressure. An engine produces positive torque at the wheels during an engine idle condition, and a pump/motor driveably connected to the wheels and the engine having variable volumetric displacement, pumps fluid to the accumulator from the reservoir. A control system determines a magnitude of negative torque transmitted from the wheels to the pump/motor that would exceed the magnitude of positive torque, determines the volumetric displacement of the pump/motor corresponding to the magnitude of negative torque, changes the displacement of the pump/motor to the required displacement, and operates the pump/motor as a pump driven by negative torque from the wheels to pump fluid from the reservoir to the accumulator.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
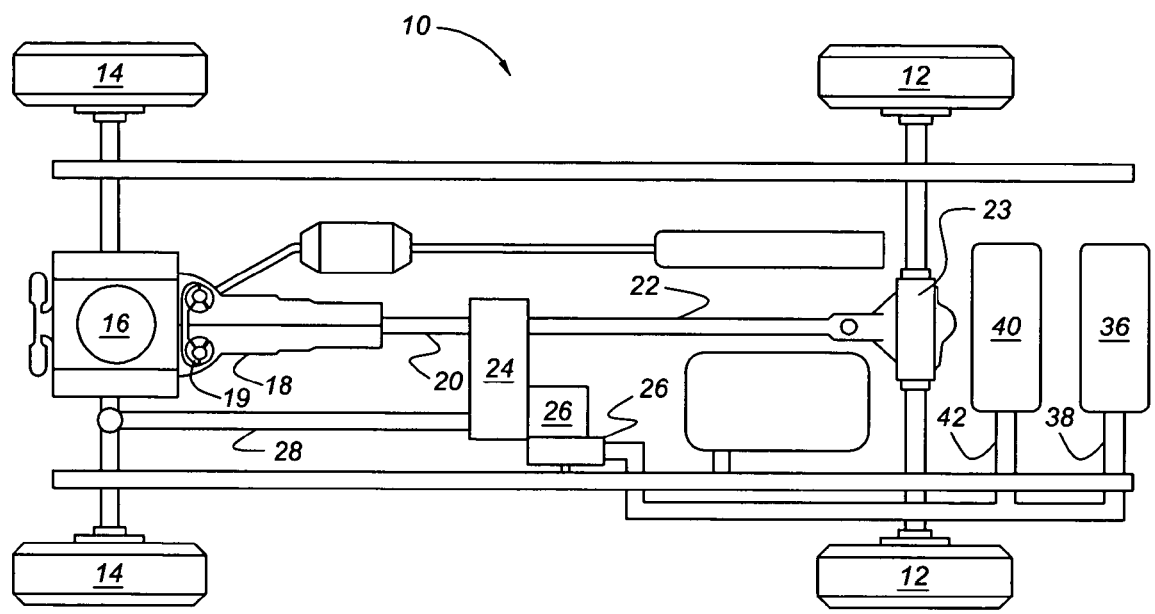
FIG. 1 is a schematic diagram of a powertrain for a hydraulic hybrid motor vehicle that operates in a brake regenerative mode and power assist mode.

Referring now to the drawings, there is illustrated in FIG. 1 a hydraulic hybrid powertrain 10 for driving the rear wheels 12 and front wheels 14 of a motor vehicle. A power source 16, such as an internal combustion engine, is driveably connected to a transmission 18, preferably an automatic transmission that produces multiple ratios of the speed of the engine and the speed of an output shaft 20. Suitable alternative transmissions include those that are manually operated, and those that produce continuously variable speed ratios or infinitely variable speed ratios, having chain drive, belt drive or traction drive mechanisms. The transmission output shaft 20 is continually driveably connected to the rear wheels 12 through a rear driveshaft 22, rear axle shafts, and a rear differential mechanism. A transfer case 24 selectively transfers a portion of the torque carried by output shaft 20 to a front driveshaft 28, which is driveably connected to the front wheels 14 through a front differential mechanism and front axle shafts. The vehicle, therefore, can operate in all-wheel drive or four-wheel drive modes.

A hydraulic pump/motor 26 having a variable volumetric displacement is continually driveably connected to the transmission output shaft 20 and to the rear driveshaft 22. When torque is transmitted in a positive torque directional sense, i.e., from the engine to the wheels, the engine 16 drives the pump/motor 26 through the transmission 18 and output shaft 20, and the rear wheels 12 through the driveshaft 22. When torque is transmitted in the negative torque direction, from the wheels to the engine, the rear wheels 12 drive the pump/motor 26 through rear driveshaft 22 and the transfer case 24. A dog clutch located in the transfer case 24 produces a releasable drive connection between the pump/motor 26 and the front driveshaft 28. A reservoir 36 containing hydraulic or pneumatic fluid at relative low pressure is connected through check valves and fluid lines 38 to the pump motor 26, as described with reference to FIG. 3. Similarly, an accumulator 40 containing hydraulic or pneumatic fluid at relative high pressure is connected through check valves and fluid lines 42 to the pump motor 26.

While accelerating the vehicle with hydraulic power assist, high pressure fluid in accumulator 40 drives the pump/motor 26, and the wheels 12, 14 are driven in rotation by the pump/motor, which operates then as a fluid motor. During operation in the brake regeneration mode, the vehicle is decelerated at least partially by recovering vehicle kinetic energy in the form of pressurized hydraulic fluid contained in accumulator 40. In the brake regeneration mode, the pump/motor 26 pumps fluid from reservoir 36 to the accumulator 40. The wheels 12 drive the pump/motor 26 through the rear axles and driveshaft 22, and the pump/motor 26 pumps fluid from reservoir 36 across a pressure differential between the pump inlet, which communicates with reservoir 36, and the pump outlet, which communicates with accumulator 40. Fluid entering the accumulator 40 compresses nitrogen contained in a bladder in the accumulator 40, and the accumulator is pressurized.

Figure 2:
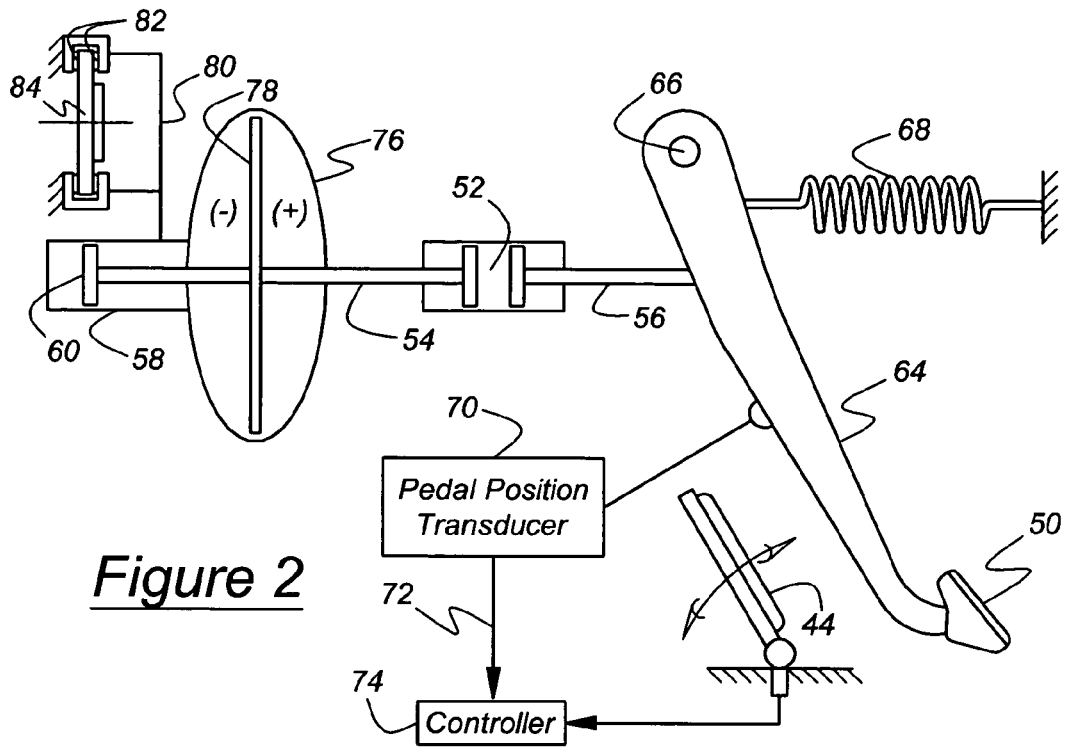
FIG. 2 is a schematic diagram of a brake pedal for use in controlling the brake regeneration mode of the powertrain of FIG. 1.

Referring now to FIG. 2, in a conventional vehicle when the foot brake pedal 50 is applied, the vehicle decelerates due to friction braking, i.e., frictional contact of brake pads or brake shoes on wheel brake rotors or drums. The kinetic energy of the vehicle is converted by this frictional contact to heat, which is dissipated. In a deadband parallel regenerative braking system, a space 52 is located between connecting rods 54, 56, which connect a brake master cylinder 58 and the foot brake pedal 50. The space 52 causes the brake pedal to move from the rest position shown in FIG. 2 through a first portion of its full displacement before hydraulic brake pressure is generated in the master cylinder due to movement of the piston 60 within the master cylinder 58. This delays the application of the wheel friction brakes as the pedal is being displaced. The range of brake pedal displacement, in which no friction braking occurs, called the "deadband" region, is preferably about 30 percent of the full range brake pedal displacement beginning when the brake pedal is at rest and not displaced.

A tension spring 68, fastened to a brake lever 64 between the fulcrum 66 and the pedal 50, provides a force sensed by the vehicle operator and resisting brake pedal displacement in the deadband range. The force of spring 68, produced when depressing the brake pedal 50, compensates for the absence of a hydraulic pressure force opposing pedal displacement and piston movement in the master cylinder while the pedal is in the deadband range. A power brake canister 76 contains a piston 78, which is actuated by engine vacuum to increase the force applied to connecting rod 54 by depressing the brake pedal 50.

A brake pedal position transducer 70 produces an electronic signal 72 as input to controller 74 representing the position of the brake pedal 50. Controller 74 operates under control of a microprocessor, which executes programmed control logic for controlling the hydraulic system of FIG. 3 and the vehicle powertrain. The controller 74 receives input signals produced by other sensors representing fluid pressure at various places in the hydraulic system, volumetric displacement of the pump/motor, the magnitude of a variable swashplate angle that alters the displacement of the pump/motor, displacement of the accelerator pedal 44 and brake pedal 64, various inputs produced by the vehicle operator and powertrain system inputs. The controller 74 issues command signals, received by solenoid-operated hydraulic control valves of the hydraulic system causing the valves to produce various system operating states and transitions among those states.

Pressure in the hydraulic brake system 80, which actuates the friction brakes 82, changes as pressure in the master cylinder 58 changes due to displacement of piston 60 in the cylinder as the brake pedal 50 is depressed and released. When the brake pedal 50 is depressed beyond the deadband range sufficiently to close the space 52, brake system pressure forces the brake pads 82 into frictional contact with the brake disc 84, to which a wheel 12 is fixed.

In addition to the friction brakes, the vehicle is braked also by a regenerative brake system. While the brake pedal 50 is depressed, the operating states of hydraulic pump/motor 26 are changed between a pump state and motor state in response to command signals produced by controller 74.

Figure 3:
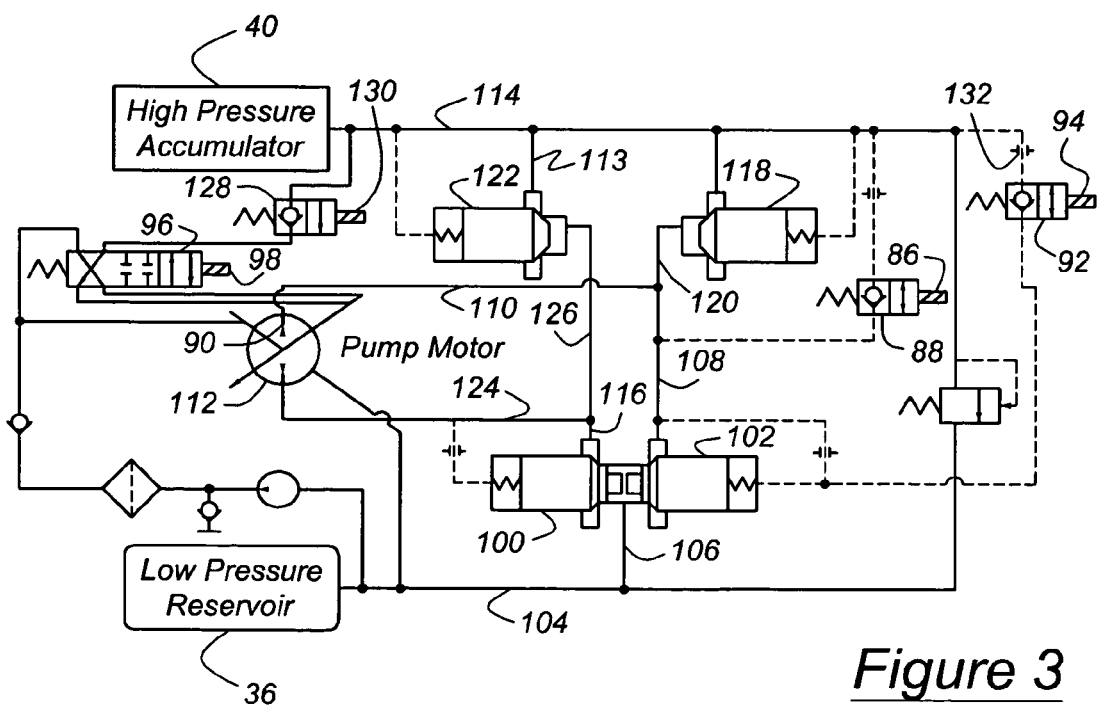
FIG. 3 is a hydraulic circuit diagram showing the pump/motor, accumulator, control valves and hydraulic lines connecting them.

The mode valve 88 is switched between the closed state shown in FIG. 3 and an open state by a solenoid 86 in response to command signals from controller 74. A low flow rate valve 92 is switched between the closed state shown in FIG. 3 and an open state by a solenoid 94 in response to command signals produced by controller 74.

Preferably the pump/motor 26 is a bent-axis variable displacement unit whose maximum displacement is 150 cc. per revolution, and available commercially from Ifield Technology, Inc. At peak pressure of about 5000 psi., the pump/motor produces approximately 600 ft-lb of braking torque in the pumping mode or acceleration torque in the motoring mode to the driveshaft 22. Displacement of the pump/motor is varied by changing the angular disposition of a swashplate. System fluid in a pressure range 2500–5000 psi. is used to control the swashplate angle. A PID control system continually produces a command signal tending to minimize the difference between the current swashplate angle and the angle corresponding to the desired magnitude of torque produced by the pump/motor 26.

A four-way swashplate control valve 96, also called a proportional valve, changes the variable displacement of the pump/motor 26 in response to commands issued by controller 74. Solenoid 98 changes the state of valve 96 among three states, a center position where the inlet and outlet of valve 96 are mutually disconnected, a left-hand position where the angular disposition of the swashplate and displacement of the pump/motor 26 decrease, and a right-hand position where the swashplate angle and displacement of the pump/motor 26 increase. Proportional valve 96 is switched between its states by a solenoid 98 in response to command signals from controller 74.

Poppet valves 100, 102 move rightward from the position of FIG. 3 to open a hydraulic connection between reservoir 36 and the inlet 90 of the pump/motor 26 through lines 104, 106, 108, 110. Poppet valves 100, 102 move leftward from the position of FIG. 3 to open a hydraulic connection between the outlet 112 of the pump/motor 26 and reservoir 36 through lines 124, 116, 106, 104. Poppet valve 118 moves rightward from the position of FIG. 3 to open a hydraulic connection between accumulator 40 and the inlet 90 of the pump/motor 26 through lines 114, 120 and 110. Poppet valve 122 moves leftward from the position of FIG. 3 to open a hydraulic connection between outlet 112 of the pump/motor 26 and accumulator 40 through lines 124, 126, 113 and 114. Poppet valves 118 and 122 are closed in the positions shown in FIG. 3

An isolation valve 128, controlled by solenoid 130 in response to command signals from controller 74, alternately opens and closes a connection between accumulator 40 and an inlet of valve 96.

In operation, to place the hydraulic system in the pumping operation mode, isolation valve 128 opens a connection from accumulator 40 to the proportional valve 96, which is moved to the right-hand state, where variable force solenoid 98 is prepared to increase displacement of the pump/motor 26 by increasing the swashplate angle. Poppet check valves 100, 102 are moved rightward to connect reservoir 36 to the inlet port 90 of the pump/motor 26 through hydraulic lines 104, 106, 108 and 110. Check valve 118 closes line 120 from the accumulator 40, but check valve 122 opens line 126 to the accumulator 40 through line 114 when pump/motor 26 is turning and pressure at the pump outlet 112 exceeds the pressure in the accumulator 40. These steps complete a hydraulic circuit from the reservoir 36 to and through the pump/motor 26, and from pump/motor to the accumulator 40. Preferably the control signal applied to solenoid 98 is an electric current in the range 0–2 amps. The swashplate angle and displacement of the pump/motor 26 changes in proportion to the magnitude of the current signal at solenoid 98.

Pump displacement is directly related to the torque necessary to rotate the pump rotor at a given hydraulic pressure. When the brake pedal 50 is in the deadband range, the system operates in the pump mode, and vehicle braking is entirely accomplished by the pump 26. If the brake pedal is displaced past the deadband range, vehicle braking is accomplished by combination of regenerative braking and friction braking in the correct proportion to achieve the vehicle deceleration rate desired by the vehicle operator.

Before switching the hydraulic system from pumping operation mode to the motoring mode, the proportional valve 96 first causes the pump/motor displacement to be zero so that cavitation of the pump/motor is prevented during the transition. Proportional control is also prevented, i.e., if the controller determines that a positive swash angle is desired in order to meet powertrain system requirements, the controller nonetheless maintains pump/motor displacement at zero until the transition of the system to the motoring mode is completed. Isolation valve 128 is closed upon a command from controller 74 to its actuating solenoid 130. Then the low flow rate valve 92 is opened, which forces poppet check valves 100, 102 leftward, thereby closing line 106 from line 108, and opening line 116 to reservoir 36 through lines 104 and 106. This opens a hydraulic connection between reservoir 36 and the pump/motor outlet 112. With the hydraulic system so disposed, the accumulator is connected through line 114, restriction orifice 132, valve 92 and lines 108, 110 to the inlet 90. The low flow rate valve 92 is opened for a period of about 200 ms. until the system is pressurized sufficiently by accumulator 40. Controller 74 includes a countdown timer, which expires in about 200 ms. after the transition to pumping mode begins.

Then when the timer expires, the low flow rate valve 92 closes and the mode valve 88 opens to the accumulator pressure, which moves poppet check valve 118 rightward, thereby opening a high flow rate connection between accumulator 40 and the pump/motor inlet 90 through line 114, valve 118, and lines 120, 110. These steps complete the transition to the motoring mode. Thereafter, controller 74 permits proportional control, and the pump/motor displacement follows input from the accelerator pedal representing desired wheel torque increases and decreases.

Figure 4:
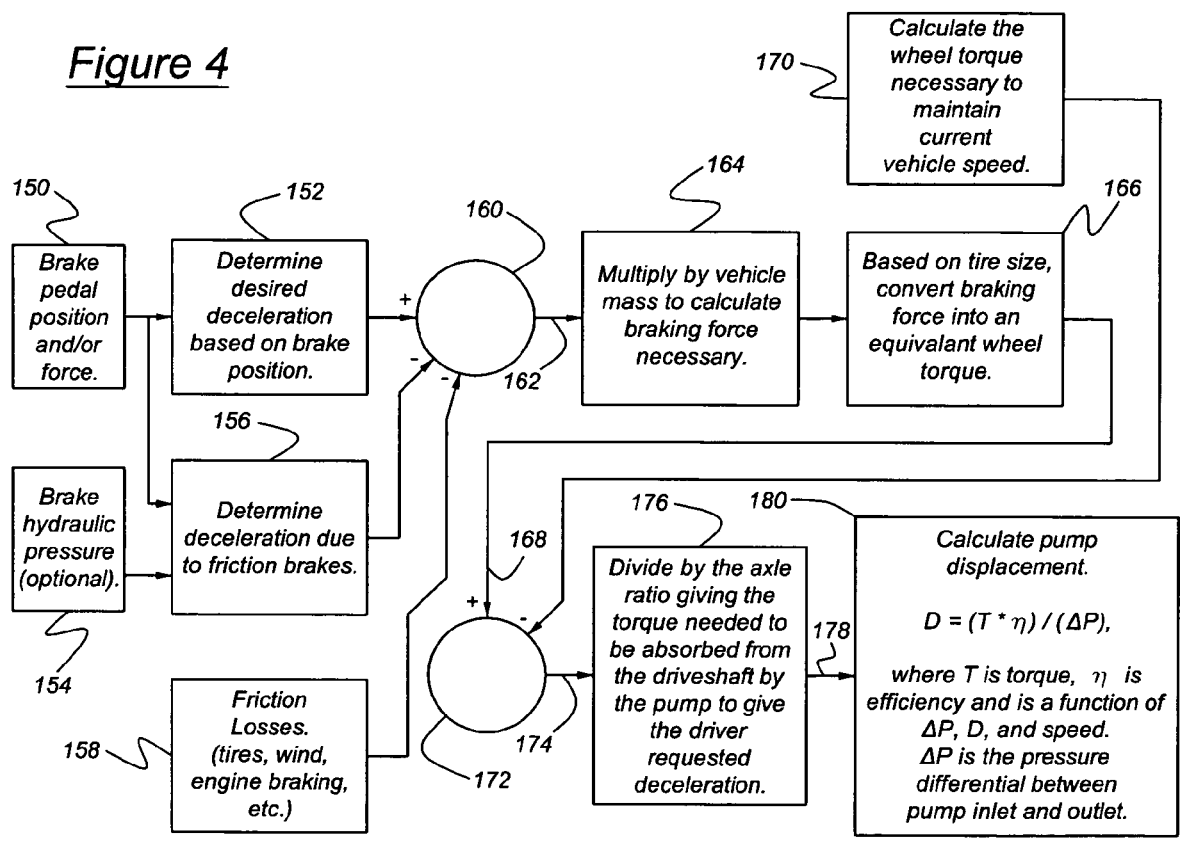
FIG. 4 is diagram of logic for controlling the brake regeneration mode in a deadband range of brake pedal position.

Referring now to FIG. 4, after the vehicle operator depresses the brake pedal, the extent to which the brake pedal is depressed 150, called "brake pedal position," is used to determine the current desired vehicle deceleration rate 152. Brake system hydraulic pressure 154 at the wheel brakes is used with the brake pedal position 150 to determine the corresponding vehicle deceleration rate due to applying the friction brakes 156. Parasitic drag on the vehicle 158 due to tire friction and air friction, and the effects of engine braking are used to determine vehicle deceleration due to these factors. The vehicle deceleration rates 152, 156, 158 are added algebraically at summing junction 160 to produce a net vehicle deceleration rate 162.

At 164, the vehicle mass is multiplied by the net vehicle deceleration rate 162 to produce the magnitude of force, which if applied to the vehicle, would produce the net vehicle deceleration rate 162.

That force is converted at 166 to an equivalent wheel torque 168 using the tire size and a nominal coefficient of friction between the tires and the road surface. At 170, the wheel torque required to maintain the current vehicle speed is calculated. At summing junction 172, the magnitude of the difference between torques 168 and 170 is calculated to determine the change in wheel torque 174 necessary to stop the vehicle from the current speed at the desired deceleration rate 152.

At 176, that differential torque 174 is divided by the axle ratio to determine the magnitude of torque 178 that must be deducted from the torque transmitted by the driveshaft 28 to the pump/motor 26 in order to produce the desired vehicle deceleration rate 152. Then at 180, the pump displacement corresponding to torque 178 is calculated. The controller 74 produces a command signal that is transmitted to solenoid 98 of the a proportional valve 96 in order to change the angular position of the swashplate and to change the displacement of the pump/motor 26 to the pump displacement calculated at 180.

The brake hold control uses the hydraulic drive system for braking a stopped vehicle against creeping while automatic transmission 18 is in gear despite there being little or no vehicle kinetic energy to recover by regenerative braking. The brake hold control determines whether (1) the transmission 18 is in gear, i.e., whether a gear selector controlled by the vehicle operator is a drive range, (2) the brake pedal 50 is depressed, and (3) the vehicle is stopped or has a speed that is equal to or less than a low reference speed. The position of the gear selector is controlled by the vehicle operation by moving a selector among forward drive, park, neutral and reverse drive ranges, called PRNDL positions.

If these conditions are true, and provided an accelerator pedal 44 is not depressed, the brake hold control is activated. Mode valve 88 is placed in the pump position by solenoid 86 in response to a control signal from controller 74. Isolation valve 128 is energized by solenoid 130, thereby connecting the accumulator 40 to the inlet of swashplate control valve 96, so that displacement of the pump/motor 26 can be increased, preferably linearly, to its maximum displacement, through operation of solenoid 98 in response to commands from controller 74. Displacement of the pump/motor 26 is increased such that the magnitude of negative torque transmitted to the wheels 12 by the pump/motor 26 is greater than the magnitude of positive torque transmitted from the engine through the transmission 18 and its torque converter to the wheels 12. In this way the vehicle wheels 12 are braked sufficiently so that the vehicle will not creep due to the effect of the idling engine transmitting torque to the wheels through the torque converter of the automatic transmission. This control requires minimal brake pedal effort to keep the vehicle stopped in an idling condition.

Controller 74 determines the magnitude of torque produced by the engine on the basis of engine speed, engine throttle position, mass air flow and other pertinent engine parameters. The transmission gear ratio and axle ratio are then used to determine by calculation the torque transmitted to the wheels by the idling engine. That torque is comparable to the torque 170 of FIG. 4. The displacement of the pump/motor 26 that will produce enough negative torque at the wheels to react to the idle torque is determined as described with reference to step 178. Then the controller produces a command signal that is transmitted to solenoid 98 of the proportional valve 96 to change the angular position of the swashplate and the displacement of the pump/motor 26 to a displacement slightly greater than the pump displacement calculated at 128.

Referring to FIG. 5, after being initialized at 200, the control executed by controller 74 first checks at 202 whether the poppet, flow, mode, isolation and proportional valves are closed. Then at 204 a check is made to determine whether the pump mode entry conditions are met. The pump mode is entered if the controller determines a need for increased torque, vehicle speed is less than about 30–40 mph, pressure in accumulator is less than a predetermined magnitude, and other similar powertrain system conditions. If those conditions are logically true, at 206 isolation valve 128 is placed in its ON state by the controller 74 issuing a command signal to its actuating solenoid 130. The proportional valve 96 is ramped to its desired displacement magnitude by changing the magnitude of current supplied to solenoid 98 at step 208, and full proportional control is initiated at 210. When the pump mode exit conditions are present, at 212 the proportional valve 96 is ramped down to produce zero pump/motor displacement and torque at 214. The pumping mode exit conditions are essentially the opposite of the corresponding entry conditions.

If the pump entry conditions are logically false, a check is made at 216 to determine whether the motor entry conditions are logically true. If so, proportional control is prevented at 218, the isolation valve 128 is placed in its ON state at 220 by issuing a command signal to its actuating solenoid 130, the low flow valve 92 is placed in its ON state at 222, and low flow timer is set. The motoring mode entry conditions include a powertrain condition for which torque produced by the pump/motor is desired to drive the vehicle wheels, the presence of a sufficient magnitude of fluid pressure and volume in the accumulator, vehicle speed in a range 0–30 mph, and additional powertrain system conditions. A check is made at 224 to determine whether the low flow timer has expired. If so, at 226, the mode valve 88 is placed in its ON state, and low flow valve 92 is turned OFF. Next at 228, full proportional control is enabled. A check is made at 230 to determine whether the motor exit conditions are logically true. If so, at 232 the proportional valve 96 begins to ramp motor displacement and torque output by the pump/motor 26 down to zero. When the proportional valve has completed the linear decrease of pump/motor displacement to zero, as indicated by a positive test at 234, at 236 the mode valve 88 is closed at 236.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for opposing creep in a vehicle that includes wheels driveably connected to a pump/motor having a variable volumetric displacement for pumping fluid between a high pressure accumulator and a low pressure reservoir, and an engine driveably connected to the wheels and to the pump/motor, the method comprising the steps of:

determining a magnitude of positive torque at the wheels that is transmitted from the engine during an engine idle condition;

determining a magnitude of negative torque transmitted from the wheels to the pump/motor that would exceed said magnitude of positive torque and hold the wheels against creeping;

determining the volumetric displacement of the pump/motor corresponding to said magnitude of negative torque;

changing the displacement of the pump/motor to said volumetric displacement; and operating the pump/motor as a pump driven by negative torque from the wheels to pump fluid from the reservoir to the accumulator.

2. The method of claim 1, wherein the vehicle includes a brake pedal having a range of pedal displacement including a deadband displacement range, and an accelerator pedal having a variable position, the method further comprising:

determining from the position of the accelerator pedal whether the engine is idling; and determining whether the brake pedal is displaced in the deadband range; and operating the pump/motor as a pump if the engine is idling and the brake pedal displacement is in the deadband range.

3. The method of claim 1, wherein the vehicle includes a torque converter driveably connected to the engine, a transmission driveably connected to the torque converter, and an axle driveably connected to the transmission, and wherein step of determining a magnitude of positive torque at the wheels further comprises the steps of:

determining an increase of said engine torque produced at an output of the torque converter;

determining an increase of the torque at the torque converter produced at an output of the transmission; and determining an increase of torque at the transmission output produced by an axle at the wheels.

4. The method of claim 1, wherein the step of determining the volumetric displacement of the pump/motor corresponding to said magnitude of negative torque, further comprises:

calculating the pump displacement from $D=[T*\eta]/\Delta P$, wherein D is the volumetric displacement of the pump/motor, T is the magnitude of torque to be applied to the pump/motor by the wheels, $\eta$ is operating efficiency of the pump/motor, and $\Delta P$ is a pressure differential between an inlet and outlet of the pump/motor.

5. A system for opposing creep in a hydraulic hybrid motor vehicle having driven wheels, comprising:

an accumulator containing fluid at relatively high pressure;

a reservoir containing fluid at lower pressure;

an engine for producing a magnitude of positive torque at the wheels during an engine idle condition;

a pump/motor driveably connected to the wheels and the engine, and having a variable volumetric displacement for pumping fluid to the accumulator from the reservoir, and driveably connected to the wheels and the engine;

brake means responsive to brake pedal displacement in the deadband range for placing the pump/motor in a pump state wherein the pump/motor is driven by the wheels and pumps fluid from the reservoir to the accumulator; and a control system for determining a magnitude of negative torque transmitted from the wheels to the pump/motor that would exceed said magnitude of positive torque, determining the volumetric displacement of the pump/motor corresponding to said magnitude of negative torque, changing the displacement of the pump/motor to said volumetric displacement, and operating the pump/motor as a pump driven by negative torque from the wheels to pump fluid from the reservoir to the accumulator.

6. The system of claim 5, wherein the control system comprises:

a control valve for changing the volumetric displacement of the pump/motor while the pump/motor operates in the pump state.

7. The system of claim 5, further comprising:

a brake pedal having a range of pedal displacement including a deadband displacement range;

a friction brake system for applying and releasing friction brakes at the wheels in response to displacement of the brake pedal outside the deadband range; and said brake means is responsive to brake pedal displacement outside the deadband range for placing the pump/motor in a pump state wherein the pump/motor is driven by the wheels and pumps fluid from the reservoir to the accumulator.

8. The system of claim 5, further comprising:

a brake pedal having a range of pedal displacement including a deadband displacement range;

a control valve for changing the volumetric displacement of the pump/motor while operating in the motor state in response to displacement of the brake pedal;

a mode valve for alternately placing the pump/motor in a pump state wherein the pump/motor is driven by the wheels and pumps fluid from the reservoir to the accumulator;

a sensor producing a signal representing the position of the brake pedal; and a controller producing command signals for operating the mode valve and control valve in response to the signal representing the position of the brake pedal.

9. The system of claim 8, wherein the controller further determines a desired vehicle deceleration based on the brake pedal position and producing command signals for operating the mode valve and control valve in response to the desired vehicle deceleration.

10. The system of claim 5, further comprising:

a brake pedal having a range of pedal displacement including a deadband displacement range;

a friction brake system responsive to displacement of the brake pedal for applying and releasing friction brakes located at the wheels; and wherein the brake pedal further comprises a connector for connecting the brake pedal to the friction brake system, the connector defines the deadband range wherein brake pedal displacement is not transmitted to the friction brake system], and a second range outside the deadband range wherein brake pedal displacement is transmitted to the friction brake system.

* * * * *